(12) United States Patent
Hart

(10) Patent No.: US 9,154,472 B2
(45) Date of Patent: Oct. 6, 2015

(54) METHOD AND APPARATUS FOR IMPROVING SECURITY DURING WEB-BROWSING

(75) Inventor: Matt E. Hart, Lunenburg, MA (US)

(73) Assignee: INTUIT INC., Mountain View, CA (US)

( * ) Notice: Subject to any disclaimer, the term of this patent is extended or adjusted under 35 U.S.C. 154(b) by 2304 days.

(21) Appl. No.: 11/485,600

(22) Filed: Jul. 12, 2006

(65) Prior Publication Data

US 2008/0016552 A1   Jan. 17, 2008

(51) Int. Cl.
*H04L 29/06* (2006.01)
*H04L 29/12* (2006.01)
*H04L 9/32* (2006.01)
*H04L 29/08* (2006.01)

(52) U.S. Cl.
CPC .......... *H04L 63/0442* (2013.01); *H04L 9/3271* (2013.01); *H04L 61/1511* (2013.01); *H04L 63/0823* (2013.01); *H04L 63/168* (2013.01); *H04L 67/02* (2013.01)

(58) Field of Classification Search
CPC .......................... H04L 61/1511; H04L 9/3271
USPC ......................................................... 713/162
See application file for complete search history.

(56) References Cited

U.S. PATENT DOCUMENTS

| | | | | |
|---|---|---|---|---|
| 5,949,882 A * | 9/1999 | Angelo | ......................... | 713/185 |
| 6,256,664 B1 * | 7/2001 | Donoho et al. | ................ | 709/204 |
| 6,421,781 B1 * | 7/2002 | Fox et al. | ........................... | 726/4 |
| 6,675,095 B1 * | 1/2004 | Bird et al. | ....................... | 701/301 |
| 6,704,024 B2 * | 3/2004 | Robotham et al. | ............ | 345/581 |
| 6,769,060 B1 * | 7/2004 | Dent et al. | ..................... | 713/168 |
| 6,826,291 B2 * | 11/2004 | Yoshiura et al. | .............. | 382/100 |
| 6,904,417 B2 * | 6/2005 | Clayton et al. | .................. | 705/59 |
| 6,907,525 B2 * | 6/2005 | Pazi et al. | ...................... | 713/170 |
| 6,961,783 B1 * | 11/2005 | Cook et al. | ..................... | 709/245 |
| 7,017,046 B2 * | 3/2006 | Doyle et al. | ................... | 713/178 |
| 7,111,325 B2 * | 9/2006 | Keohane et al. | ................ | 726/22 |
| 7,206,932 B1 * | 4/2007 | Kirchhoff | ....................... | 713/152 |
| 7,313,691 B2 * | 12/2007 | Bantz et al. | ................... | 713/155 |
| 7,496,634 B1 * | 2/2009 | Cooley | .......................... | 709/206 |
| 7,562,384 B1 * | 7/2009 | Huang | .............................. | 726/5 |
| 7,673,049 B2 * | 3/2010 | Dinello et al. | ................ | 709/226 |
| 7,676,828 B1 * | 3/2010 | DeCaprio | ......................... | 726/4 |

(Continued)

OTHER PUBLICATIONS

RFC 2246: The TLS Protocol; T. Dierks, C. Allen; Jan. 1999.*

(Continued)

*Primary Examiner* — James Turchen
(74) *Attorney, Agent, or Firm* — Park, Vaughan, Fleming & Dowler LLP

(57) ABSTRACT

One embodiment of the present invention provides a system that improves security during web-browsing. During operation, the system can receive a URL from a user. Next, the system can determine an IP address for the URL by querying a DNS server. The system can then determine a public-key associated with the URL. Next, the system can encrypt a string using the public-key to obtain an encrypted-string. The system can then send the encrypted-string to a remote-system which is associated with the IP address. Next, the system can receive a response from the remote-system. The system can then determine whether the DNS server has been compromised using the string and the response. If the system determines that the DNS server has been compromised, the system can alert the user, and in doing so, improve security during web-browsing.

26 Claims, 2 Drawing Sheets

(56) References Cited

U.S. PATENT DOCUMENTS

| | | | |
|---|---|---|---|
| 7,725,930 B2* | 5/2010 | Lawrence et al. | 726/10 |
| 7,774,459 B2* | 8/2010 | Wang et al. | 709/224 |
| 7,853,533 B2* | 12/2010 | Eisen | 705/64 |
| 7,870,608 B2* | 1/2011 | Shraim et al. | 726/22 |
| 2002/0010627 A1* | 1/2002 | Lerat | 705/14 |
| 2002/0033844 A1* | 3/2002 | Levy et al. | 345/744 |
| 2004/0255137 A1* | 12/2004 | Ying | 713/193 |
| 2005/0119052 A1* | 6/2005 | Russell et al. | 463/42 |
| 2006/0123478 A1* | 6/2006 | Rehfuss et al. | 726/22 |
| 2006/0176822 A1* | 8/2006 | Doyle et al. | 370/241 |
| 2007/0083670 A1* | 4/2007 | Kelley et al. | 709/245 |
| 2007/0220591 A1* | 9/2007 | Damodaran et al. | 726/4 |
| 2007/0261112 A1* | 11/2007 | Todd et al. | 726/11 |

OTHER PUBLICATIONS

Rolf Oppliger and Sebastian Gajek; Effective Protection Against Phishing and Web Spoofing; CMS 2005; LNCS 3677, pp. 32-41;2005.*

Challenges in Securing the Domain Name System; Ramaswamy Chandramouli et al.; IEEE; Feb. 2006.*

Domain Name System (DNS) Services: NIST Recommendations for Secure Deployment; http://www.itl.nist.gov/lab/bulletns/bltnjun06.htm; Jun. 2006.*

* cited by examiner

METHOD AND APPARATUS FOR IMPROVING SECURITY DURING WEB-BROWSING

BACKGROUND

Related Art

The World Wide Web (WWW) has permeated almost all aspects of our lives—from buying cameras to buying real estate, and from reading a newspaper to watching a movie. Unfortunately, the WWW can also be a very dangerous place where even savvy users can compromise highly sensitive information or suffer substantial financial loss.

A common security problem on the Internet involves a malicious website posing as a legitimate one. For example, a user may receive a malicious email which contains a link that seems legitimate; however, when the user clicks on the link, it navigates the user's web-browser to a malicious website which is specifically designed to extract private information from the unsuspecting user. For example, the malicious website may prompt the user to enter his or her login name and/or password, bank account number, credit card number, etc.

If the user is careful, he or she may be able to detect some security problems. For example, after clicking on a link in the email, the user can verify that the URL (Universal Resource Locator) that appears in the web-browser's address bar is for a legitimate website. Some prior art techniques automate this process and restrict the user to only a list of legitimate websites to ensure that the user does not visit a malicious website. However, this technique can prevent the user from visiting legitimate websites that are not on the list.

Unfortunately, prior art techniques usually do not detect security threats which exploit a compromised DNS (Domain Name System) server. DNS is a distributed network of name servers which enables computer systems to resolve domain names to IP (Internet Protocol) addresses. However, when a user queries a compromised DNS server, the DNS server may return the IP address of a malicious website, instead of the IP address of the legitimate website. Note that prior art techniques usually cannot detect such DNS-based security threats because the address bar in the web-browser displays the URL of a legitimate website.

SUMMARY

One embodiment of the present invention provides a system that improves security during web-browsing. During operation, the system can receive a URL from a user. Next, the system can determine an IP address for the URL by querying a DNS server. The system can then determine a public-key associated with the URL. Next, the system can encrypt a string using the public-key to obtain an encrypted-string. The system can then send the encrypted-string to a remote-system which is associated with the IP address. Next, the system can receive a response from the remote-system. The system can then determine whether the DNS server has been compromised using the string and the response. If the system determines that the DNS server has been compromised, the system can alert the user, and in doing so, improve security during web-browsing.

In a variation on this embodiment, the string can contain: the IP address for the URL; a second IP address which is associated with the user's computer; a timestamp which can specify the date and time when the string was encrypted; or a random string.

In a variation on this embodiment, the system can alert the user by displaying a watermark to the user using a web-browser.

In a variation on this embodiment, the system can use a web-browser toolbar.

In a variation on this embodiment, the system can determine the IP address by: sending a query-message with the URL's domain name to the DNS server; and receiving a response-message from the DNS server which contains the IP address.

In a variation on this embodiment, the system can determine the public-key by: sending a query-message with the URL to a trusted system which stores public-keys; and receiving a response-message from the trusted system which contains the public-key associated with the URL.

In a variation on this embodiment, the system can determine whether the DNS server has been compromised by comparing the string with the response.

One embodiment of the present invention provides a system that determines whether a network has been compromised. During operation, the system can determine a public-key which is associated with a URL which contains a domain name. Next, the system can query a DNS server to determine an IP address for the domain name. The system can then send an encrypted-string to the IP address, wherein the encrypted-string is determined using a string and the public-key. Next, the system can receive a response from a remote-system which is associated with the IP address. The system can then determine whether the network has been compromised using the string and the response. Note that the DNS server can be located within the network. Specifically, in one embodiment, the system determines that the network has been compromised by determining that the DNS server has been compromised.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Network

Figure 1:
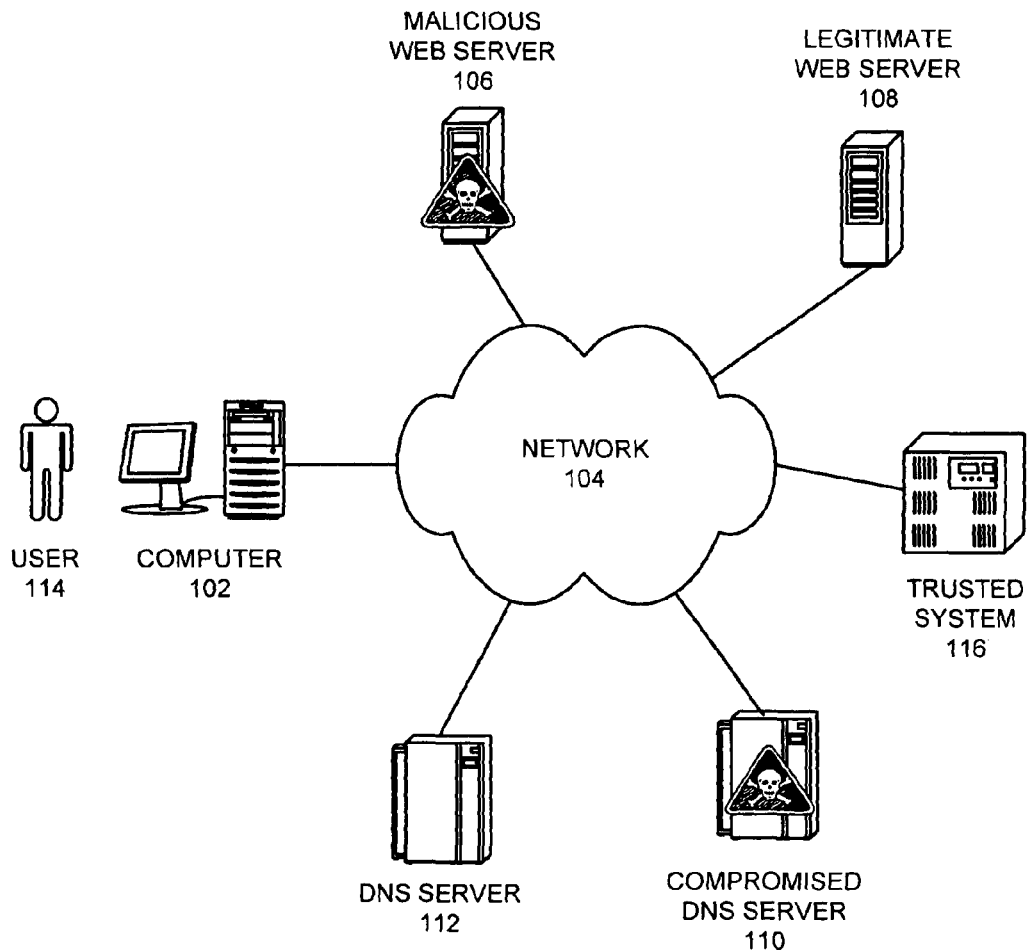
FIG. 1 illustrates a network that is coupled with a number of network nodes in accordance with an embodiment of the present invention.

FIG. 1 illustrates a network that is coupled with a number of network nodes in accordance with an embodiment of the present invention.

Network 104 is coupled with computer 102, malicious web-server 106, legitimate web-server 108, trusted system 116, compromised DNS server 110, and DNS server 112.

Network 104 can generally comprise any type of wire or wireless communication channel capable of coupling together network nodes. This includes, but is not limited to, a local area network, a wide area network, or a combination of networks, or other network enabling communication between two or more computing systems. In one embodiment of the present invention, network 104 comprises the Internet.

A network node, such as a computer 102, can generally include any type of communication device capable of communicating with other network nodes via a network. This includes, but is not limited to, a computer system based on a microprocessor, a mainframe computer, a server, a printer, a video camera, an external disk drive, a router, a switch, a personal organizer, a mobile phone, or other computing system capable of processing data.

Network 104 allows a network node, such as, computer 102, to communicate with another network node, such as, legitimate web-server 108. However, in order to communicate, computer 102 needs to know the IP address of web-server 108. Typically, computer 102 queries a DNS server, such as DNS server 112, to determine web-server 108's IP address.

Domain Name System

The Domain Name System (DNS) is a distributed network of name servers that provides a global naming service. DNS makes it possible to associate domain names to IP addresses.

Figure 2:
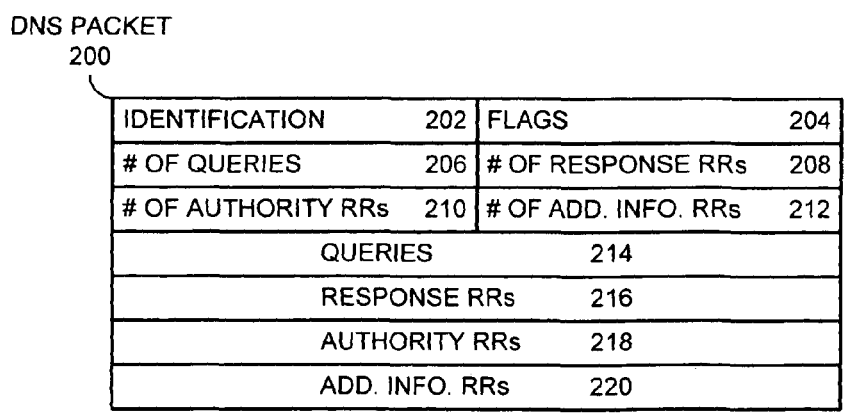
FIG. 2 illustrates a DNS packet in accordance with an embodiment of the present invention.

FIG. 2 illustrates a DNS packet in accordance with an embodiment of the present invention.

DNS packet 200 contains a number of fields that can be used by a network node, such as a computer 102, to exchange information with DNS server 112.

DNS-query packets and DNS-response packets can use the same DNS packet format. Specifically, DNS packet 200 can contain an identification field 202, which allows a network node, such as a computer 102, to match queries to the corresponding responses. DNS packet 200 can also contain a flags field 204 which can indicate whether the DNS packet 200 is a query or a response.

DNS packet 200 can also contain four variable-length fields, namely, queries 214, response resource-records 216, authority response-records 218, and additional information response-records 220. These variable-length fields can be used for exchanging information between computer 102 and DNS server 112. Additionally, DNS packet 200 can contain four other fields, namely, number of queries field 206, number of response resource-records field 208, number of authority resource-records field 210, and number of additional information resource-records field 212, which can specify the number of entries in the four variable-length fields.

DNS Hijacking

During normal operation, computer 102 can send a DNS-query packet to DNS server 112 with legitimate web-server 108's domain name. DNS server 112 can then send a DNS-response packet to computer 102 with legitimate web-server 108's IP address. Computer 102 can then use the IP address to communicate with legitimate web-server 108.

However, if the DNS server is hijacked, the DNS-response packet may contain the IP address of a malicious web-server, instead of a legitimate web-server's IP address. For example, suppose computer 102 sends a DNS-query packet to compromised DNS server 110 with legitimate web-server 108's domain name. Compromised DNS server 110 may respond by sending the IP address of malicious web-server 106, instead of sending legitimate web-server 108's IP address.

Note that prior art techniques usually cannot detect a DNS hijack because these techniques typically use the URL to detect security problems. However, during a DNS hijack, since the URL points to a legitimate website, prior art techniques are unable to detect the security problem.

Even if a security problem is detected, prior art techniques typically do not properly alert an average user. Note that there are a number of users who are not technically savvy. Although most users pay attention to the content within a web-browser's main window, they many not know or pay attention to an icon or indicator on the web-browser's toolbar which may alert them to security problems. Furthermore, it may not be preferable to prevent the user from navigating to a website simply because the web browser was unable to ascertain the legitimacy of the website.

To summarize, prior art techniques typically do not detect serious security problems such as a DNS hijack. Further, even when prior art techniques detect a security problem, they do not alert the user using an approach which is conspicuous, yet non-invasive.

Process for Improving Security During Web-Browsing

Figure 3:
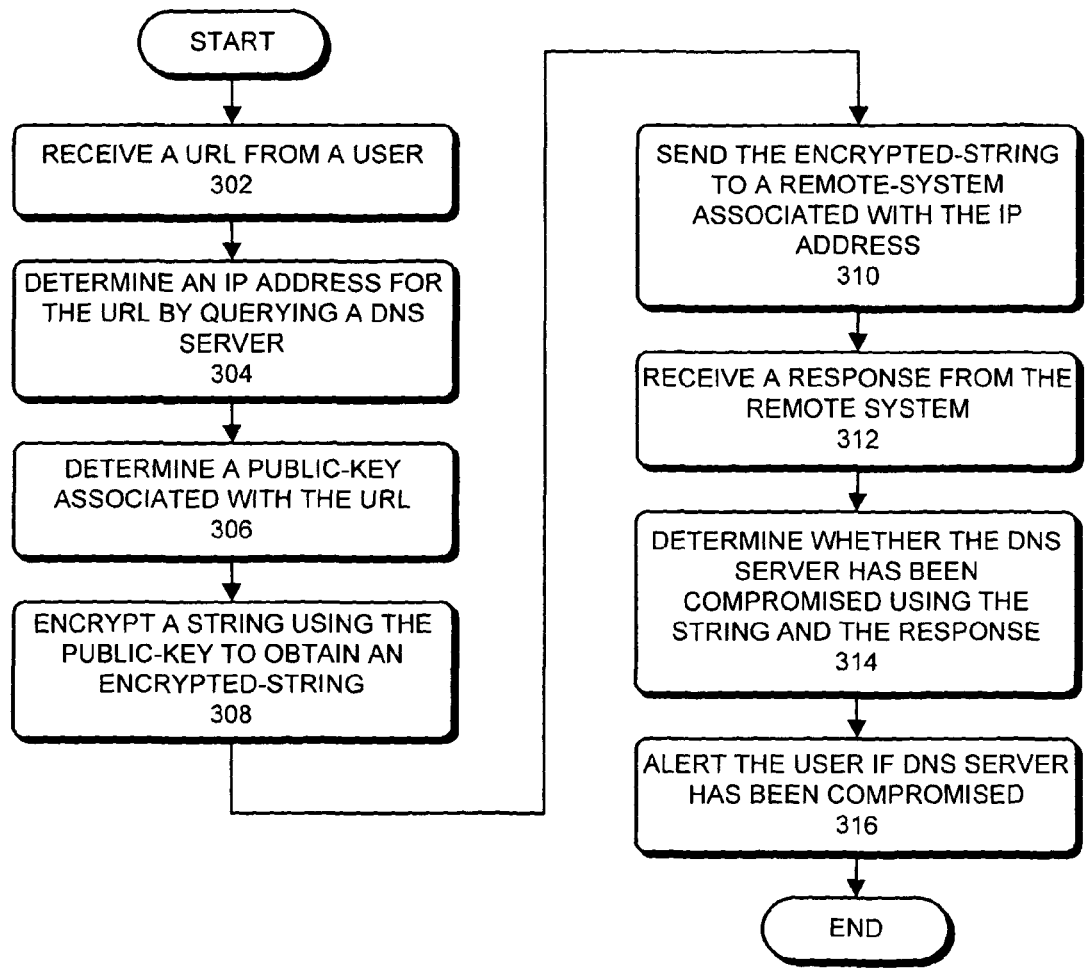
FIG. 3 presents a flowchart that illustrates a process for improving security during web-browsing in accordance with an embodiment of the present invention.

FIG. 3 presents a flowchart that illustrates a process for improving security during web-browsing in accordance with an embodiment of the present invention. Note that the process can be performed by a web-browser toolbar.

The process can begin by receiving a URL from a user (step 302). For example, computer 102 may receive the URL when user 114 enters the URL in the address bar of a web-browser or when user 114 clicks on a link in an email or on a website.

Next, the system can determine an IP address for the URL by querying a DNS server (step 304).

Specifically, the system can send a query-message with the URL's domain name to the DNS server. The system can then receive a response-message from the DNS server which contains the IP address.

For example, computer 102 can send a query-message with the URL's domain name to compromised DNS server 110 (or to DNS server 112), which can send a response-message back to computer 102 with an IP address.

The system can then determine a public-key associated with the URL (step 306).

Note that the system can determine the public-key using a number of techniques. For example, the system (e.g., computer 102) can send a query-message with the URL to a trusted system (e.g., trusted system 116) which stores public-keys. Computer 102 can then receive a response-message from trusted system 116 which contains the public-key associated with the URL.

Alternatively, the system may lookup the public-key in a local keystore which contains the public-keys for a number of URLs and/or trusted systems. Further, one or more public-keys may be hard-coded in the web-browser software. For example, a public-key for trusted system 116 may be hard-coded in the web-browser software. In yet another embodiment, the system can receive a signed public-key, which proves that the public-key is associated with the URL.

Next, the system can encrypt a string using the public-key to obtain an encrypted-string (step 308).

The string can be any string that can help the system to verify the identity of the URL. Specifically, the string can contain the IP address for the URL, a second IP address which is associated with the user's computer, a timestamp which can specify the date and time when the string was encrypted, or a random string. Note that the string can be a concatenation of a number of sub-strings which can contain the above-described information.

The system can then send the encrypted-string to a remote-system which is associated with the IP address (step 310).

For example, if computer 102 queries DNS server 112, it may receive legitimate web-server 108's IP address. On the other hand, if computer 102 queries compromised DNS server 110, it may receive malicious web-server 106's IP address. Hence, in the first scenario, computer 102 can send the encrypted-string to the legitimate web-server 108, and in the second scenario, computer 102 can send the encrypted-string to the malicious web-server 106.

Note that the encrypted-string can be sent using a networking protocol, such as, TCP (Transport Control Protocol), SSL (Secure Socket Layer), TLS (Transport Layer Security), HTTP (HyperText Transfer Protocol), or a combination thereof. In one embodiment, the encrypted-string is sent to the remote-system using HTTP's "POST" method.

Next, the system can receive a response from the remote-system (step 312).

The remote-system can generally be any system capable of communicating with the user's computer. For example, the remote-system can be a web-server. In one embodiment, the remote-system can generate the response using a server script, such as, a PHP script (PHP is a scripting language commonly used in server-side applications) or an ASP.NET script (ASP.NET is a set of web development technologies from Microsoft Corporation). In another embodiment, the remote-system can generate the response using an ASAPI (Apache Server Application Programming Interface) module.

Recall that the system encrypted the string using the public-key that was associated with the URL. Hence, if the remote-system is a legitimate web-server for the URL, it should be able to decrypt the encrypted-string using the matching private-key. On the other hand, if the remote-system is a malicious web-server that is posing as a legitimate web-server, then it won't be able to decrypt the encrypted-string because it won't have the matching private-key.

For example, legitimate web-server 108 may be able to decrypt the encrypted-string; however, malicious web-server 106 will not be able to decrypt the encrypted-string.

The response received from the remote-system can comprise any string which enables the user's client to verify that the remote-system is a legitimate web-server for the URL.

In one embodiment, the remote-system can return the decrypted string in the response which demonstrates that the remote-system has the matching private-key, thereby proving that it is a legitimate web-server for the URL. In another embodiment, the remote-system can first decrypt the encrypted-string to obtain the string. Next, the remote-system can encrypt the string using the user's public key, and send it to the user's computer.

The system can then determine whether the DNS server has been compromised using the string and the response (step 314).

Specifically, the system can compare the string with the response. If they match, the system can conclude that the DNS server has not been compromised. On the other hand, if they do not match, the system can conclude that the DNS server has been compromised. If the remote-system encrypted the response using the user's public-key, the system can first decrypt the response using the user's private-key. Next, the system can compare the decrypted response with the string.

For example, since malicious web-server 106 was unable to decrypt the encrypted-string, it may either send no response (which may result in a timeout) or send a response which would clearly demonstrate that malicious web-server 106 does not have the matching private-key. In either case, computer 102 can conclude that DNS server 110 has been hijacked. On the other hand, legitimate web-server 108 may be able to decrypt the encrypted-message and send a valid response. In this case, computer 102 can correctly conclude that DNS server 112 has not been compromised.

In another embodiment, the system can determine that a DNS server has been compromised by first sending query-messages with the URL's domain name to a number of DNS servers. The system can then receive response-messages from the DNS servers that contain IP addresses. Next, the system can use these IP addresses to determine whether a DNS server has been compromised. For example, if a particular DNS server returns the IP address of malicious web-server 106, whereas all other DNS servers return the IP address of legitimate web-server 108, the system can determine that the DNS server has been compromised. Note that this technique assumes that it is highly unlikely that multiple DNS servers would be compromised at the same time. Hence, this technique may not be able to detect the security problem if multiple DNS servers are compromised. In contrast, the technique that uses a URL's public-key does not suffer from this drawback. Specifically, even if a number of DNS servers are compromised, the public-key based technique can still determine whether a particular DNS server has been compromised or not.

If the system determines that the DNS server has been compromised, the system can alert the user (step 316).

Note that the system can use a number of techniques to alert the user. For example, the computer 102 can display an icon within the web-browser's screen or within the web-browser's toolbar. Alternatively, the computer 102 can generate an audio signal (e.g., a beeping sound) to alert user 114. In another embodiment, the computer 102 can replace the served webpage with a warning webpage which alerts the user that the website has been compromised. In addition to a warning message, the warning webpage can comprise an explanation on what has happened, how to fix it, and a link to the originally requested webpage.

Prior art techniques typically use small icons or pop-up windows to alert users about security issues. Unfortunately, many users do not know the meaning of the various buttons and/or icons on a web-browser. Further, many users turn off pop-ups because they can interfere with web-browsing. Additionally, many users turn off the sound because they may be in a meeting or at the library. Hence, it may be preferable to alert the user in a conspicuous manner, albeit using a non-invasive technique.

In one embodiment, the system can alert the user by displaying a watermark using a web-browser. The watermark can be integrated with the webpage's content. In one embodiment, the system can embed a conspicuous watermark with the webpage content received from the remote-system and display the modified webpage to the user. Note that users typically pay attention to the information in the web-browser's "main window" which is used to display content from websites. Hence, displaying a watermark can substantially increase the probability that the user will be alerted about the security problem. The user's web-browsing experience may not be affected because the system may not display a watermark during normal web-browsing; rather, the system may display the watermark only when the user visits a malicious website. Furthermore, since the watermark is typically in the background of the webpage, it is not invasive.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

For example, the techniques and systems described in the above disclosure can be used to detect a number of network security problems. Specifically, although the invention has been described in the context of detecting a compromised DNS-server, the invention can generally be used to detect any compromised component of IP translation and routing. For example, the invention can detect a compromised router which has been configured to send all packets destined for legitimate web-server 108 to malicious web-server 106.

The above disclosure is not intended to limit the present invention. The scope of the present invention is defined by the appended claims.

What is claimed is:

1. A non-transitory computer-readable storage medium storing instructions that when executed by a computer cause the computer to perform a method for improving security during web-browsing, the method comprising:
 receiving a Universal Resource Locator (URL) from a user;
 determining an Internet Protocol (IP) address for the URL by querying a Domain Name Server (DNS) server;
 determining a public key associated with the URL;
 encrypting a string using the public key to obtain an encrypted string;
 sending the encrypted string to a remote system which is associated with the IP address;
 receiving a response from the remote system;
 determining that the DNS server has been compromised when the response from the remote system does not match an expected response; and
 responsive to determining that the DNS server has been compromised, alerting the user, thereby improving security during web-browsing.

2. The non-transitory computer-readable storage medium of claim 1, wherein the string contains at least one of:
 the IP address for the URL;
 a second IP address which is associated with the user's computer;
 a timestamp which can specify the date and time when the string was encrypted; and
 a random string.

3. The non-transitory computer-readable storage medium of claim 1, wherein alerting the user involves embedding a conspicuous watermark within a webpage for the URL and displaying the webpage with the watermark to the user using a web browser.

4. The non-transitory computer-readable storage medium of claim 1, wherein the method is performed by a web browser toolbar.

5. The non-transitory computer-readable storage medium of claim 1, wherein determining the IP address involves:
 sending a query message with the URL's domain name to the DNS server; and
 receiving a response message from the DNS server which contains the IP address.

6. The non-transitory computer-readable storage medium of claim 1, wherein determining the public-key involves:
 sending a query message with the URL to a trusted system which stores public keys; and
 receiving a response message from the trusted system which contains the public-key associated with the URL.

7. The non-transitory computer-readable storage medium of claim 1, wherein the method further comprises:
 comparing the string with the response from the remote system to determine whether the response from the remote system matches the expected response.

8. An apparatus for improving security during web-browsing, the apparatus comprising:
 a memory comprising computer executable instructions;
 a hardware processor configured to execute the computer executable instructions to perform the steps of:
 receiving a Universal Resource Locator (URL) from a user;
 determining an Internet Protocol (IP) address for the URL by querying a Domain Name System (DNS) server;
 determining a public key associated with the URL;
 encrypting a string using the public key to obtain an encrypted string;
 sending the encrypted string to a remote system which is associated with the IP address;
 receiving a response from the remote system;
 determining that the DNS server has been compromised when the response from the remote system does not match an expected response; and
 alerting the user in response to the determination indicating that the DNS server has been compromised, thereby improving security during web-browsing.

9. The apparatus of claim 8, wherein the string contains at least one of:
 the IP address for the URL;
 a second IP address which is associated with the user's computer;
 a timestamp which can specify the date and time when the string was encrypted; and
 a random string.

10. The apparatus of claim 8, wherein the processor is further configured to embed a conspicuous watermark within a webpage for the URL and to display the webpage with the watermark to the user using a web browser.

11. The apparatus of claim 8, wherein the processor is further configured to:
 send a query message with the URL's domain name to the DNS server; and
 receive a response message from the DNS server which contains the IP address.

12. The apparatus of claim 8, wherein the processor is further configured to:
 send a query message with the URL to a trusted system which stores public-keys; and to receive a response message from the trusted system which contains the public key associated with the URL.

13. The apparatus of claim 8, wherein the processor is further configured to compare the string with the response from the remote system to determine whether the response from the remote system matches the expected response.

14. A non-transitory computer-readable storage medium storing instructions that when executed by a computer cause the computer to perform a method to determine whether a network has been compromised, the method comprising:
 determining a public key which is associated with a Universal Resource Locator (URL) which contains a domain name;

querying a Domain Name System (DNS) server to determine an Internet Protocol (IP) address for the domain name;
sending an encrypted string to the IP address using a network, wherein the encrypted string is determined using a string and the public key;
receiving a response from a remote system which is associated with the IP address; and
determining that the network has been compromised when the response from the remote system does not match an expected response.

15. The non-transitory computer-readable storage medium of claim 14, wherein the string contains at least one of:
the IP address for the domain name;
a second IP address which is associated with the user's computer;
a timestamp which can specify the date and time when the string was encrypted; and
a random string.

16. The non-transitory computer-readable storage medium of claim 14,
wherein the method is performed by a web-browser toolbar;
wherein the DNS server is located within the network;
wherein determining whether the network has been compromised involves determining whether the DNS server has been compromised.

17. The non-transitory computer-readable storage medium of claim 14, wherein determining the public key involves:
sending a query message with the URL to a trusted system which stores public-keys; and
receiving a response message from the trusted system which contains the public-key associated with the URL.

18. The non-transitory computer-readable storage medium of claim 14, wherein querying the DNS server involves:
sending a query message with the domain name to the DNS server; and
receiving a response message from the DNS server which contains the IP address.

19. The non-transitory computer-readable storage medium of claim 14, wherein the method further comprises:
comparing the string with the response from the remote system to determine whether the response from the remote system matches the expected response.

20. An apparatus to determine whether a network has been compromised, the apparatus comprising:
a memory comprising computer executable instructions;
a hardware processor configured to execute the computer executable instructions to perform the steps of:
determining a public key which is associated with a Universal Resource Locator (URL) which contains a domain name;
querying a Domain Name System (DNS) server to determine an Internet Protocol (IP) address which is associated with the domain name;
sending an encrypted string to the IP address using a network, wherein the encrypted string is determined using a string and the public key;
receiving a response from a remote system which is associated with the IP address; and
determining that the network has been compromised when the response from the remote system does not match an expected response.

21. The apparatus of claim 20, wherein the string contains at least one of:
the IP address for the URL;
a second IP address which is associated with the user's computer;
a timestamp which can specify the date and time when the string was encrypted; and
a random string.

22. The apparatus of claim 20, wherein the processor is further configured to:
send a query-message with the URL to a trusted system which stores public keys; and to receive a response message from the trusted system which contains the public key associated with the URL.

23. The apparatus of claim 20, wherein the processor is further configured to:
send a query message with the domain name to the DNS server; and
receive a response message from the DNS server which contains the IP address.

24. The apparatus of claim 20, wherein the processor is further configured to compare the string with the response from the remote system to determine whether the response from the remote system matches the expected response.

25. A method for improving security during web-browsing, the method comprising:
receiving a Universal Resource Locator (URL) from a user;
determining an Internet Protocol (IP) address for the URL by querying a Domain Name System (DNS) server;
determining a public key associated with the URL;
encrypting a string using the public key to obtain an encrypted string;
sending the encrypted string to a remote system which is associated with the IP address;
receiving a response from the remote system;
determining that the DNS server has been compromised when the response from the remote system does not match an expected response; and
responsive to determining that the DNS server has been compromised, alerting the user, thereby improving security during web-browsing.

26. A method to determine whether a network has been compromised, the method comprising:
determining a public key which is associated with a URL (Universal Resource Locator) which contains a domain name;
querying a DNS (Domain Name System) server to determine an IP (Internet Protocol) address for the domain name;
sending an encrypted string to the IP address using a network, wherein the encrypted string is determined using a string and the public key;
receiving a response from a remote system which is associated with the IP address; and
determining that the network has been compromised when the response from the remote system does not match an expected response.

* * * * *